United States Patent
Morris (10) Patent No.: US 10,335,724 B1
(45) Date of Patent: Jul. 2, 2019

(54) FILTER AND BARRIER

(71) Applicant: Ertec Environmental Systems LLC, Alameda, CA (US)

(72) Inventor: Vincent P. Morris, Alameda, CA (US)

(73) Assignee: ERTEC ENVIRONMENTAL SYSTEMS LLC, Alameda, CA (US)

( * ) Notice: Subject to any disclaimer, the term of this patent is extended or adjusted under 35 U.S.C. 154(b) by 478 days.

(21) Appl. No.: 15/085,184

(22) Filed: Mar. 30, 2016

Related U.S. Application Data (60) Provisional application No. 62/141,217, filed on Mar. 31, 2015.

(51) Int. Cl.
*B01D 29/03* (2006.01)
*B01D 39/16* (2006.01)

(52) U.S. Cl.
CPC ......... *B01D 39/1692* (2013.01); *B01D 29/03* (2013.01); *B01D 2029/033* (2013.01)

(58) Field of Classification Search
CPC .... B01D 29/03; B01D 29/05; B01D 39/1692; B01D 2029/033; E02B 3/04
See application file for complete search history.

(56) References Cited

U.S. PATENT DOCUMENTS

| | | |
|---|---|---|
| 929,728 A | 8/1909 | Taylor |
| 1,618,288 A | 2/1927 | Kinzie |
| 2,341,515 A | 2/1944 | Reyfeld |
| 3,112,262 A | 11/1963 | Parkinson |
| 3,455,112 A | 7/1969 | Twele |
| 4,279,535 A | 7/1981 | Gagliardi |
| 4,301,996 A * | 11/1981 | Holyoak ............... A01G 13/105 256/1 |
| 4,721,408 A | 1/1988 | Hewlett |
| 4,804,299 A | 2/1989 | Forte |
| 4,854,773 A | 8/1989 | Nicoll |
| 5,097,624 A * | 3/1992 | Klayman ............... A01G 13/10 47/31 |
| 5,108,224 A | 4/1992 | Cabiniss |
| 5,157,867 A | 10/1992 | Fritch |
| 5,257,878 A | 11/1993 | Peterson |
| 5,338,131 A | 8/1994 | Bestmann |
| 5,492,551 A * | 2/1996 | Wolfe ................ B01D 39/1692 55/496 |
| 5,575,584 A | 11/1996 | Hsu |
| 5,584,600 A | 12/1996 | Langdon |
| 5,605,416 A | 2/1997 | Roach |
| 5,633,888 A | 5/1997 | Chinn et al. |

(Continued)

FOREIGN PATENT DOCUMENTS

| | | |
|---|---|---|
| CA | 2533232 | 7/2006 |
| GB | 2171131 | 8/1986 |
| WO | WO 2007/005895 | 1/2007 |

*Primary Examiner* — Jason M Greene
(74) *Attorney, Agent, or Firm* — T. H. P. Richardson (57) ABSTRACT

An elongate barrier material comprising an elongate apertured load-bearing sheet material and an elongate apertured filter material attached to the load-bearing sheet material. The apertures in the filter material have an ASTM D-4751 size less than 500μ and the size of the apertures in the load-bearing material is at least 4 times the size of the apertures in the filter material. The length of the filter material can be changed elastically so that the barrier material can be transported in the form of a roll which can be unrolled for installation.

20 Claims, 3 Drawing Sheets

(56) References Cited

U.S. PATENT DOCUMENTS

| | | | |
|---|---|---|---|
| 5,641,243 A | 6/1997 | Hsu | |
| 5,733,825 A | 3/1998 | Martin et al. | |
| 5,944,443 A | 8/1999 | Benedict | |
| 5,954,451 A | 9/1999 | Presby | |
| 5,954,952 A * | 9/1999 | Strawser, Sr. | B01D 29/05 210/164 |
| 6,017,166 A | 1/2000 | Mossburg | |
| 6,109,835 A | 8/2000 | Grabhorn | |
| 6,214,216 B1 | 4/2001 | Isaacson | |
| 6,277,473 B1 | 8/2001 | McGinn | |
| 6,332,737 B1 | 12/2001 | Mattson | |
| 6,422,787 B1 | 7/2002 | Mikell | |
| 6,497,532 B1 | 12/2002 | McGinn | |
| 6,505,996 B1 | 1/2003 | Ianello et al. | |
| 6,510,947 B1 * | 1/2003 | Schulte | B01D 29/05 210/388 |
| 6,547,493 B2 | 4/2003 | Spangler et al. | |
| 6,551,505 B2 | 4/2003 | Chinn et al. | |
| 6,641,335 B1 | 11/2003 | Allard | |
| 6,709,579 B1 | 3/2004 | Singleton et al. | |
| 6,733,209 B2 | 5/2004 | Allard | |
| 6,811,708 B2 | 11/2004 | Shaw et al. | |
| 6,848,866 B1 | 2/2005 | McGinn | |
| 6,905,289 B1 | 6/2005 | Sanguinetti | |
| 6,929,425 B1 | 8/2005 | Kimberlin et al. | |
| 6,974,540 B1 | 12/2005 | Fleischman | |
| 7,008,144 B2 | 3/2006 | McGinn | |
| 7,131,787 B2 | 11/2006 | McGinn | |
| 7,172,372 B2 | 2/2007 | McGinn | |
| 7,544,016 B2 | 6/2009 | McGinn et al. | |
| 7,955,030 B2 | 6/2011 | McGinn et al. | |
| 8,402,630 B2 | 3/2013 | McGinn et al. | |
| 2001/0037982 A1 * | 11/2001 | Pulek | B01D 39/1692 210/767 |
| 2002/0020658 A1 | 2/2002 | Isaacson | |
| 2002/0172564 A1 * | 11/2002 | Brown | E01F 7/025 405/302.6 |
| 2003/0095833 A1 * | 5/2003 | Janz | E02B 3/04 403/410 |
| 2003/0143026 A1 | 7/2003 | Santha | |
| 2005/0089376 A1 | 4/2005 | Maxwell | |
| 2006/0039761 A1 * | 2/2006 | McGinn | E02B 3/043 405/302.6 |
| 2006/0226406 A1 | 10/2006 | Vise | |
| 2007/0280789 A1 | 12/2007 | Mason | |
| 2008/0157044 A1 | 7/2008 | Barfield | |
| 2010/0154347 A1 | 6/2010 | Jessen | |
| 2011/0311318 A1 | 12/2011 | Taylor | |
| 2013/0309012 A1 * | 11/2013 | Lancaster | E02B 3/04 405/21 |
| 2016/0279575 A1 * | 9/2016 | Kobuke | B01D 39/1692 |

* cited by examiner

FILTER AND BARRIER

CROSS-REFERENCE TO RELATED APPLICATIONS

This application claims priority from Provisional Application No. 62/141,217, filed Mar. 31, 2015 by Vincent P Morris. The entire disclosure of Application 62/141,217 is incorporated by reference in this application for all purposes.

This application is related to U.S. Pat. Nos. 6,848,866, 7,008,144 7,131,787, 7,172,372, 7,554,016, 7,955,030 and 8,402,630. The entire disclosure of each of those patents is incorporated by reference herein for all purposes.

BACKGROUND OF THE INVENTION

This invention relates to filter materials, barriers, and methods for installing barriers, in particular, but not limited to, (i) apertured barriers which comprise filter materials and which can collect sediment from sediment-containing water and (ii) apertured barriers which comprise filter materials and which have a dual function of controlling the movement of small vertebrates and of collecting sediment from sediment-containing water. The known apertured barriers which comprise filter materials are available only in short sections. As a result, they must be installed (and, if need be, later removed, cleaned and reinstalled) in short sections.

SUMMARY OF THE INVENTION

This invention provides an apertured barrier which (i) comprises a filter material and a load-bearing sheet material, (ii) can be transported in the form of a roll, and (iii) can be unrolled and then installed in longer sections than have been previously possible. The purpose of the barrier can be to collect sediment from sediment-containing water and/or to control the movement of small vertebrates.

First Aspect of the Invention.

The first aspect of the invention is a novel filter material which
  (1) comprises, and preferably consists essentially of,
    (A) a first set of melt-extruded polymeric strands which are parallel to each other and spaced apart from each other, and
    (B) a second set of melt-extruded polymeric strands which are parallel to each other, are spaced apart from each other, and are at an angle to the first strands
  the first and second sets of polymeric strands (i) being bonded to each other at crossover sections at which the polymeric strands are bonded together, and (ii) forming open apertures which have an aperture size, measured by the procedure of ASTM D-4751, which is less than 500μ (0.500 mm), preferably less than 450μ, particularly less than 400μ, for example 200-400 microns, particularly 200-300 microns,
  (2) has a percentage open area (POA, measured by COE 02215-86) of at least 25%, preferably at least 30%, for example 20-60%, particularly about 55%, and
  (3) has a length which can be changed elastically by at least 0.03%, preferably at least 0.05%, for example at the least 0.1%, for example up to 0.5%, or even more The new filter has the advantage that it can be secured to a long length of a load-bearing sheet material to provide a barrier which can be in the form of a roll for storage and transportation purposes, but which can be unrolled for installation along an extended barrier line.

Preferably the filter has a thickness of less than 60 mils (0.060 inch), preferably 10-40 mils (0.01-0.04 inch), particularly 15-30 mils (0.015-0.03 inch), and a width of at least 4 inch, preferably 6 to 36 inch. A thickness of less than 60 mils is preferred because the thicker the filter, the more resistant it is to the flow of sediment-bearing water through it, which (when the filter is part of a barrier) can cause rapid, unwanted clogging.

When the filter is in use as part of a barrier, the smaller the overall size of the filter, the smaller the aperture size of the filter, and the greater the number of tortuous paths through the filter, the more likely it is that the filter will be subject to rapid, unwanted clogging.

Second Aspect of the Invention.

In its second aspect, this invention provides a barrier material which comprises (1) a load-bearing apertured sheet material and (2) a filter material (i) which is attached to the load-bearing sheet material, (ii) which comprises apertures which are substantially smaller than the apertures in the load-bearing apertured sheet material and (iii) whose length can be changed without making the filter ineffective. The barrier material preferably has a uniform cross-section along its length, with the filter extending lengthwise over part or all of the load-bearing sheet material, but not beyond it. Because the length of the filter can be changed, the barrier material can be in the form of a roll which can be stored and transported, and can then be unrolled. The barrier material, after it has been unrolled, is suitable for installation as a barrier.

The load-bearing apertured sheet material preferably comprises, and may consist essentially of,
  (A) a first set of melt-extruded polymeric strands which are parallel to each other and spaced apart from each other with a distance between adjacent strands of 0.1 to 0.5 inch, for example 0.1 to 0.3 inch, and
  (B) a second set of melt-extruded polymeric strands which are parallel to each other, are spaced apart from each other with a distance between adjacent strands of 0.1 to 0.5 inch, for example 0.1 to 0.3 inch, and are at an angle to the first strands;
the first and second sets of polymeric strands (i) being bonded to each other at crossover sections at which the polymeric strands are bonded together, and (ii) forming open apertures. Preferably, each of the first and second polymeric strands has a thickness in the laminar dimension of the sheet between the crossover points of 0.04 to 0.5 inch.

Preferably the size of the apertures in the load-bearing sheet material is at least 4 times, particularly at least 8 times, the size of the apertures in the filter, and can be as much as 35 times, e.g. 8-12 times, the size of the apertures in the filter.

The filter material in the barrier according to the second aspect of the invention is preferably a filter material according to the first aspect of the invention.

In one embodiment of the second aspect of the invention, the barrier material is in the form of a roll having multiple layers, each of the layers consisting essentially of the load-bearing sheet material and the filter attached to it. The barrier material can be wrapped around a core having a diameter of, for example, 1-6 inch, for example 2-5 inch, e.g. about 3 inch. The outside diameter of a roll of barrier material having a length of about 100 feet can for example be 14-20 inches. The roll can be transported easily and can be unrolled for installation. Preferably the barrier material, after being unrolled, can be re-rolled, for example if installation has to be postponed. After the barrier has been installed, it can preferably be removed after installation, and (optionally after being rerolled) cleaned, and then re-rolled, so that it can be re-installed.

The filter can be attached to the load-bearing sheet material while both the filter and the load-bearing sheet material are substantially flat, or when one or both is slightly curved. The resulting barrier material can be rolled up with the filter either inside or outside the load-bearing sheet material.

The width of the filter material can be the same as or less than the width of the load-bearing sheet material. In one embodiment, the filter material extends over an upper section of the width of the load-bearing sheet material, leaving a bottom section which does not carry the filter (and which will be installed in a trench in the ground or on top of the ground). In this embodiment, the filter can extend only part of the way to the top of the load-bearing sheet material, leaving an upper section which is free of filter. Alternatively, the filter can extend all the way to the top of the load-bearing sheet.

The attachment of the filter to the load-bearing sheet material can be accomplished in any convenient way, providing that the attachment remains sufficiently secure after the filter and the load-bearing sheet material have been rolled up, and subsequently unrolled for installation as a barrier. Preferably the attachment is such that, after the barrier has been installed, it can be removed and (optionally after being rerolled) cleaned, and then re-rolled, so that it can be re-installed.

The ability of the filter to change in length is a primary factor in the ability of the barrier material to be rolled up and unrolled. The change in the length of the filter can result from a change in the shape of the apertures and/or a change in the length of the polymeric strands. The ability (if any) of the load-bearing sheet material to change in length and the nature and durability of the attachment between the filter and the load-bearing material may also be relevant. When the attachment is made by means of an adhesive, care must be taken to insure that the presence of the adhesive does not substantially decrease the effectiveness of the filter. Attachment by means of sewing can allow relative movement of the filter and the load-bearing material as the barrier material is rolled up and unrolled.

Third Aspect of the Invention.

The third aspect of the invention is a method for installing a barrier, the method comprising
(A) providing a barrier material in the form of a roll which comprises multiple layers, each of the layers comprising a load-bearing apertured sheet material and, attached to the load-bearing sheet material, a filter material which retains its effectiveness as a filter when the roll is unrolled,
(B) unrolling the barrier material, the length of the barrier material when it is completely unrolled being at least 25 feet, preferably at least 50 feet, e.g. 50-300 feet,
(C) creating a barrier by installing the roll of barrier material, the barrier material being installed as it is unrolled or after it has been unrolled.

The barrier is preferably installed by placing a bottom section of the barrier below the ground. Part or all of the section of the barrier that is below the ground can have, but does not necessarily have, the filter attached to it. At least part of the section of the barrier that is above the ground has the filter attached to it. However, the invention includes the possibility that the barrier is installed by attaching the bottom of the barrier to the ground, without burying it in the ground. Further details of possible installation of the barrier material, for example for the control of wildlife, as well as for sediment control, are disclosed in the patents incorporated by reference herein.

Because the barrier material is initially in the form of a roll, the installation of the barrier can be carried out as a continuous or semi-continuous operation, in contrast to the present piecemeal operation which is necessitated by the finite length of presently available barriers which include a filter. For example, the roll of barrier material can be mounted on a machine for making a trench in the ground and can be unrolled and a lower portion of the barrier material fed automatically into the trench which has just been made. The machine can also bury the lower portion of the barrier material after it has been placed in the trench.

The filter preferably retains its effectiveness as a filter even after long exposure of the installed barrier area to the elements (sun, wind, rain, sediment, wildlife, abrasion etc.) and even after two or more such cycles of use.

The barrier material is preferably a barrier according to the second aspect of the invention, particularly a barrier in which the filter is a filter according to the first aspect of the invention and/or the load-bearing apertured sheet material is the preferred load-bearing sheet material of the second aspect of the invention.

Fourth Aspect of the Invention.

The fourth aspect of the invention is a method for cleaning a barrier of the invention and which has been in use over a period of time and is, therefore, contaminated, has been removed. The method comprises, cleaning the removed barrier by a process which includes passing the removed barrier (preferably after it has been rolled up and taken to a cleaning station) through a plurality of operations, for example over a plurality of rollers on or between which the barrier is cleaned at least partially by water and/or by steam, and optionally by mechanical forces that remove and/or loosen the contaminants The cleaning operation can remove sediment and/or harmful seeds and/or weeds and/or invasive plants, and render the barrier material suitable for further use. The cleaning operation can include rolling up the cleaned barrier into a roll.

Because the barrier is in the form of a long length which can be removed and cleaned as one piece, the method is more efficient than the methods presently available for removing and cleaning barriers as a piecemeal operation.

The barrier is preferably a barrier according to the second aspect of the invention, particularly a barrier in which the filter is a filter material according to the first aspect of the invention and/or the load-bearing apertured sheet material is the preferred sheet material of the second aspect of the invention.

BRIEF DESCRIPTION OF THE DRAWINGS

The invention is illustrated in the accompanying drawings which are diagrammatic and not to scale.

DETAILED DESCRIPTION OF THE INVENTION

In the Summary of the Invention above, the Detailed Description of the Invention, the Examples, and the claims below, and the accompanying drawings, reference is made to particular features (including for example components, ingredients, elements, devices, apparatus, systems, groups, ranges, method steps, test results, etc.) of the invention. It is to be understood that the disclosure of the invention in this specification includes all possible combinations of such particular features. For example, where a particular feature is disclosed in the context of a particular aspect, a particular embodiment, a particular claim, or a particular Figure, that feature can also be used in combination with other particular aspects, embodiments, claims and Figures, and in the invention generally, except where the context excludes that possibility. The invention disclosed herein, and the claims, include embodiments not specifically described herein and can for example make use of features which are not specifically described herein, but which provide functions which are the same, equivalent or similar to, features specifically disclosed herein.

The term "comprises" and grammatical equivalents thereof are used herein to mean that, in addition to the features specifically identified, other features are optionally present. For example, a composition or device "comprising" (or "which comprises") components A, B and C can contain only components A, B and C, or can contain not only components A, B and C but also one or more other components. The term "consisting essentially of" and grammatical equivalents thereof is used herein to mean that, in addition to the features specifically identified, other features may be present which do not materially alter the claimed invention. The term "at least" followed by a number is used herein to denote the start of a range beginning with that number (which may be a range having an upper limit or no upper limit, depending on the variable being defined). For example "at least 25" means 25 or more than 25. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When a range is given as "(a first number) to (a second number)" or "(a first number)-(a second number)", this means a range whose lower limit is the first number and whose upper limit is the second number. For example, "0.1 to 0.5 inch" or "0.1-0.5 inch" means a range whose lower limit is 0.1 inch, and whose upper limit is 0.5 inch. The terms "plural", "multiple", "plurality" and "multiplicity" are used herein to denote two or more than two features.

Where reference is made herein to a method comprising two or more defined steps, the defined steps can be carried out in any order or simultaneously (except where the context excludes that possibility), and the method can optionally include one or more other steps which are carried out before any of the defined steps, between two of the defined steps, or after all the defined steps, except where the context excludes that possibility. Where reference is made herein to "first" and "second" features, this is generally done for identification purposes; unless the context requires otherwise, the first and second features can be the same or different, and reference to a first feature does not mean that a second feature is necessarily present (though it may be present). Where reference is made herein to "a" or "an" feature, this includes the possibility that there are two or more such features (except where the context excludes that possibility). Thus there may be a single such feature or a plurality of such features. Where reference is made herein to two or more features, this includes the possibility that the two or more features are replaced by a lesser number or greater number of features which provide the same function, except where the context excludes that possibility. The numbers given herein should be construed with the latitude appropriate to their context and expression; for example, each number is subject to variation which depends on the accuracy with which it can be measured by methods conventionally used by those skilled in the art.

If any element in a claim of this specification is considered to be, under the provisions of 35 USC 112, an element in a claim for combination which is expressed as a means or step for performing a specified function without the recital in the claim of structure, material, or acts in support thereof, and is, therefore, construed to cover the corresponding structure, material, or acts described in the specification and equivalents thereof, then the corresponding structure, material, or acts in question include such structure, material, or acts described in the US patent documents incorporated by reference herein and the equivalents of such structure, material, or acts.

First Aspect of the Invention.

In its first aspect, this invention provides a sheet material which is suitable for use as a filter for removing particulate material entrained in a liquid, in particular in water. The novel sheet material is particularly, but not exclusively, useful as a filter in (i) apertured barriers for collecting sediment from sediment-containing water and (ii) apertured barriers for collecting sediment while also controlling the movement of small vertebrates. The novel filter material (1) comprises, and preferably consists essentially of,
   (A) a first set of melt-extruded polymeric strands which are parallel to each other and spaced apart from each other, and
   (B) a second set of melt-extruded polymeric strands which are parallel to each other, are spaced apart from each other, and are at an angle to the first strands
   the first and second sets of polymeric strands (i) being bonded to each other at crossover sections at which the polymeric strands are bonded together, and (ii) forming open apertures which have an aperture size, measured by the procedure of ASTM D-4751, which is less than 500μ (0.500 mm), preferably less than 450μ, particularly less than 400μ, for example 200-400 microns, particularly 200-300 microns, (2) has a percentage open area (POA) of at least 25%, preferably at least 30%, for example 20-60%, particularly about 55%, and (3) has a length which can be changed elastically by at least 0.03%, preferably at least 0.05%, for example at least 0.1%, for example up to 0.5% or even more.

The new filter material has the advantage that it can be secured to a long length of a load-bearing sheet material to provide a barrier material which can be in the form of a roll for storage and transportation purposes, but which can be unrolled for installation along an extended barrier line.

The new filter material optionally has one or more of the following characteristics.

1. A thickness, measured by ASTM 5199, of less than 60 mils (0.060 inch), preferably 10-40 mils (0.01-0.04 inch), particularly 15-30 mils (0.015-0.03 inch) for example 0.022 inch.
2. A width of at least 4 inch, preferably 6 to 36 inch.
3. A length of at least 100 feet, e.g. 200 or 300 feet, from which shorter lengths can be cut when desirable.
4. A distance between the centers of adjacent strands of 0.02-0.04 inch, preferably 0.024-0.029 inch, e.g., about 0.027 inch.
5. A number of strands per inch (measured perpendicular to the strand direction) which is 30-45, for example 35-40, e.g. about 37.
6. An elasticity in the length direction such that the elongation at maximum load, measured by ASTM D4596, is 15-40%, e.g. 27-37%.
7. The angle of strands is 50-80°, for example 75°.
8. A clean water flow rate, measured by ASTM 4491, of at least 170, preferably at least 200 gallons/minute/square feet.
9. An ultimate tensile strength, measured by ASTM D4595, measured in the width direction of 50-80, e.g. 60-70, pounds
10. A tensile strength, measured by ASTM D4595, measured in the width direction, of 90-120, e.g. 105-115 pounds
11. A weight of 0.03-0.05, preferably about 0.04, pounds/square feet.
12. A nominal CBR puncture strength, measured by ASTM D6241, of 40-70, e.g. 50-60 pounds.
13. An aperture size, measured by ASTM D 40 751 of at most 550μ, preferably at most 425μ.
14. A percent open area, measured by ASTM 6767, of 30-70%, preferably 50-60%.
15. A CBR puncture strength, measured by ASTM D6241 of 45-70 lb, preferably 50-60 lb.
16. The strands are composed of a polymer having a Shore hardness at 68° F. of 8510, for example 90-100.
17. The strands are composed of a polymer having a low temperature brittleness, measured by ASTM D 746 of −80 to −120° F., e.g. about −110° F.

Preferably all the strands in the new filter are composed of the same polymeric material, for example a composition comprising polyethylene, e.g. high density polyethylene. The polymeric material is preferably one that can be recycled. The polymeric material can contain an ultraviolet stabilizer. However, it is been found preferable to avoid the use of carbon black, which is often used as an ultraviolet stabilizer, because the particles of carbon black interfere with the production of the desired mesh structure.

The new filter can be made by a process which comprises the following steps.
1. The polymeric material is extruded through a plurality of rotating orifices arranged in a circle. A continuous strand of the polymeric material comes out of each orifice. Each orifice is cut so that part of the circumference of the orifice cylinder is open and exposed to the face of the opposing counter-rotating die orifice cylinders. Each open section of each orifice is the point of contact for the molten strands of polymeric material to bond together as the orifices rotate and expose the molten strand to the molten strand of the opposite die face orifices. As a result, individual polymeric strands are continuously and intermittently bonded to each other as the counter-rotating dies progress through their cycle.
2. The resulting tubular structure is passed over an expander which increases its diameter 2-5 times, and then into a quenching bath.
3. The expanded tubular structure is cut and flattened to form a sheet material.

This process forms part of the present invention.

Second Aspect of the Invention.

In its second aspect, this invention provides a barrier material which comprises (1) a load-bearing apertured sheet material and (2) a filter material (i) which is attached to the load-bearing sheet material, (ii) which comprises apertures that are substantially smaller than the apertures in the load-bearing apertured sheet material and (iii) whose length can be changed, without making it ineffective as a filter, so that the barrier can be in the form of a roll which can be stored and transported, and can then be unrolled for installation as a barrier.

The load-bearing sheet material preferably comprises, and may consist essentially of,
(A) a first set of melt-extruded polymeric strands which are parallel to each other and spaced apart from each other with a distance between adjacent strands of 0.1 to 0.3 inch, and
(B) a second set of melt-extruded polymeric strands which are parallel to each other, are spaced apart from each other with a distance between adjacent strands of 0.1 to 0.5 inch, e.g.; 0.1 to 0.3 inch, and are at an angle to the first strands the first and second sets of polymeric strands (i) being bonded to each other at crossover sections at which the polymeric strands are bonded together, and (ii) forming open apertures. Preferably, each of the first and second polymeric strands has a thickness in the laminar dimension of the sheet between the crossover points of 0.04 to 0.5 inch.

Preferably the size of the apertures in the load-bearing sheet material is at the least 4 times, particularly at least 8 times, the size of the apertures in the filter, and can be as much as 35 times, e.g. 8-12 times, the size of the apertures in the filter.

The filter in the barrier material according to the second aspect of the invention is preferably a filter according to the first aspect of the invention.

The apertured load-bearing sheet material optionally has one or more of the following preferred characteristics.
(1) It has a percentage open area (COE 02215-86) of at least 30%, preferably at least 35%, e.g. 35-50%.
(2) When tested by ASTM D4491, it has a flow rate of at least 600, preferably at least 1500, gallons per square foot per minute.
(3) It has a weight of 0.12-0.25, e.g. 0.150-0.180, pounds per square foot.
(4) When it is exposed to ultraviolet radiation, e.g. direct sunlight, for 500 hours, it changes in tensile strength by less than 20%, for example less than 15%, e.g. less than 10%, based on the tensile strength before the test (for example when tested in accordance with ASTM 4355 or ASTM D4595).
(5) When a sample of the sheet 3 foot square is subjected to a test in which the sample is suspended vertically, with an upper edge of the sample continuously supported and the remainder of the sample hanging freely from the upper support, the supported edge being parallel to the first strands, or parallel to the second strands or being along a line which is equally inclined to the first and second strands, and the suspended sample is exposed to a temperature of 160° C. for 12 hours and then to a temperature of 20° C. for 1 hour, has a vertical dimension which changes by less than 15%, for example less than 10%, e.g. less than 5%, based on the vertical dimension before the test.
(6) When a sample of the sheet 3 foot square is subjected to a test in which the sample is supported on a flat horizontal surface and maintained for one hour at 100° C. and then at 20° C. for two hours, the sample does not change in any horizontal dimension by more than 5%, for example more than 3%, e.g. more than 1.5%, based on that dimension before the test.

(7) The first and second strands are composed of a polymeric material, preferably the same polymeric material, for example a composition comprising polyethylene, e.g. high density polyethylene. The polymeric material is preferably one that can be recycled.

(8) The first and second strands are composed of a material, e.g. a polymeric material, having a coefficient of friction which is less than 0.4, e.g. less than 0.3. This preferred characteristic is significant in making the barrier more difficult for a vertebrate to climb.

(9) The first and second strands are composed of a material, e.g. a polymeric material, having a tear strength at 20° C. of at least 15, e.g. 18-25, Newtons per square millimeter.

(10) The first and second strands are composed of a material, e.g. a polymeric material having a Shore Hardness at 20° C. of at least 80, for example 90-100.

(11) the angle between the strands in the first set of polymeric strands and the strands in the second set of polymeric strands is 30-90°, for example 45-90°, e.g. 60-80°.

(12) The width of each of the first and second strands between the crossover points in the plane of the sheet (or if the sheet is not planar, in the laminar dimension of the sheet) is 0.055-0.15 inch, for example about 0.1 inch.

(13) The thickness of the sheet at the crossover points at right angles to the plane of the sheet is 0.1-0.20 inch, e.g. about 0.12-0.16 inch.

(14) The distance between the centers of the first strands is 0.18-0.35 inch, e.g. 0.22-0.28 inch, for example 0.25 inch, and the distance between the centers of the second strands is 0.18-0.35 inch, e.g. 0.22-0.28 inch, for example 0.25 inch.

(15) The distance between adjacent edges of the first strands is 0.12-0.2 inch, for example about 0.15 inch and the distance between adjacent edges of the second strands is 0.12-0.02 inch, e.g. about 0.15 inch.

(16) The size and shape of the apertures is such that the force required to pull a sphere of diameter 0.375 inch through the apertures is at least 38 lbs.

(17) The size and shape of the apertures is such that a cylinder of diameter 0.156 inch will pass through the aperture, with the cylinder just touching the sides of the aperture, and a cylinder of diameter 0.188 inch or larger will not pass through the aperture.

(18) The weight of the sheet is 0.16 to 0.19 pounds per square foot.

(19) The sheet has a tensile strength in the machine direction of at least 400 lbs (ASTM D4595) ended the transverse direction of at least 325 lbs (ASTM D4595).

(20) The sheet has a CBR puncture strength (ASTM D6241) of at least 230 lbs.

(21) The sheet is composed of a polymer having a Shore Hardness at 68° F. of least 80.

In one embodiment of the second aspect of the invention, the barrier material is in the form of a roll having multiple layers of the load-bearing sheet material with the filter attached to it. The roll can be transported easily and can be unrolled for installation. The length of the barrier in the roll can be at least 50 feet, or substantially longer, e.g. 100 feet, 200 feet or 300 feet. The inside diameter of the roll can be, for example 1 to 8, for example 1 to 5, inch Third Aspect of the Invention.

The third aspect of the invention is a method for installing a barrier, the method comprising (A) providing a barrier material in the form of a roll which comprises a load-bearing apertured sheet material and, attached to the load-bearing sheet material, a filter material which retains its effectiveness as a filter when the roll is unrolled, (B) unrolling the barrier material, the length of the barrier material when it is completely unrolled being at least 25 feet, preferably at least 50 feet, e.g. 50-300 feet, (C) installing ling the roll of barrier material, as it is unrolled or after it has been unrolled, to provide a barrier.

Because the barrier material is in the form of a roll, the installation of the barrier can be carried out as a continuous or semi-continuous operation, in contrast to the present piecemeal operation which is necessitated by the finite length of presently available barriers which include a filter. This makes it possible to install the barrier material as part of an integrated operation which comprises making a trench in the ground and placing a lower part of the barrier in the trench immediately after the trench has been made. Optionally, the operation includes filling in the trench around the lower part of the barrier Fourth Aspect of the Invention.

The fourth aspect of the invention is a method for cleaning a barrier for which has been installed using the method of the third aspect of the invention, the method comprising (A) removing a long length of the barrier, for example a length of at least 25 feet, from the barrier, and (B) cleaning the removed barrier by a process which includes passing the removed barrier over a plurality of rollers.

Similarly to the third aspect of the invention, because the barrier is in the form of a long length which can be removed and cleaned as one piece, the method is more efficient than the methods presently available for removing and cleaning barriers as a piecemeal operation.

THE DRAWINGS

Figure 1:
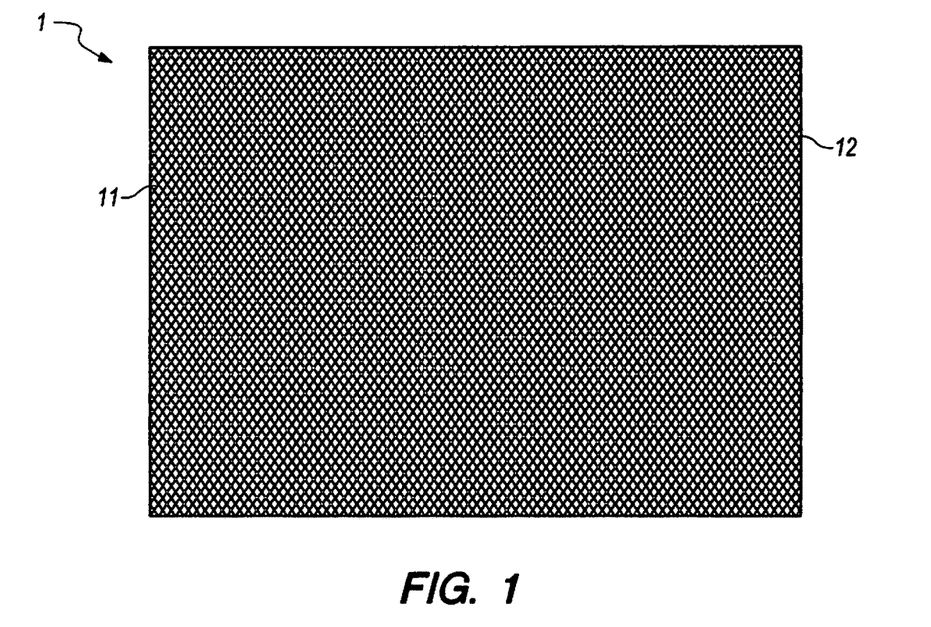
FIG. 1 is a plan view of a small section of an example of the new filter.

Referring now to the drawings, FIG. 1 is a diagrammatic plan view of a small section of an example of the new filter, 1, which is composed of a first set of melt extruded polymeric strands 11 and a second set of melt extruded polymeric strands 12, which are bonded to each other at crossover sections.

Figure 2:
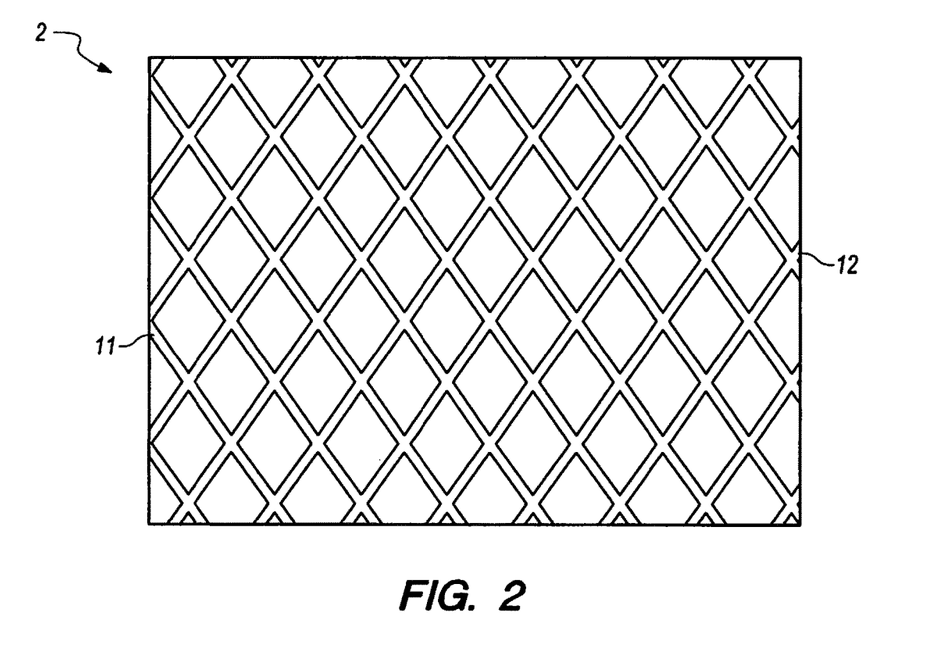
FIG. 2 is a plan view of a small section of the load-bearing sheet material.

FIG. 2 is a diagrammatic plan view of a small section of an example of the loadbearing sheet material, 2, which is composed of a first set of melt extruded polymeric strands 21 and a second set of melt extruded polymeric strands 22, which are bonded to each other at crossover sections.

Figure 3:
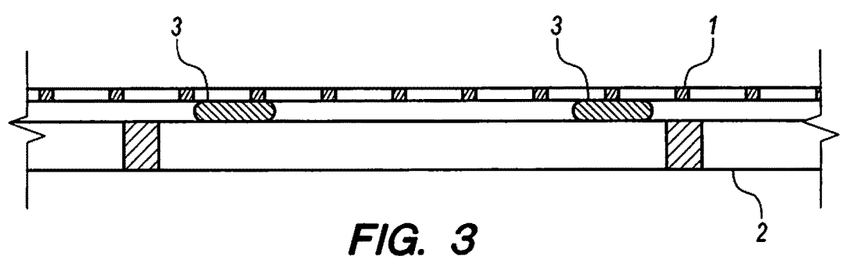
FIG. 3 is a cross-section of a flat section of an example of the barrier material of the invention.

FIG. 3 is a diagrammatic cross-sectional view of a flat section of an example of a barrier material of the invention, which comprises a filter 1, a load-bearing sheet material 2 and connection means 3 securing the filter and sheet material together.

Figure 4:
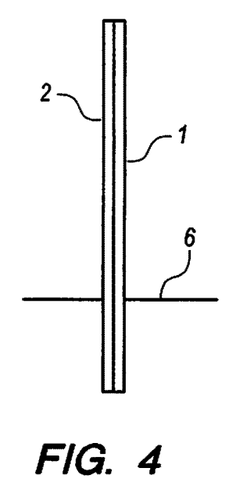
FIGS. 4-6 are side views of examples of different installed barriers of the invention.
Figure 5:
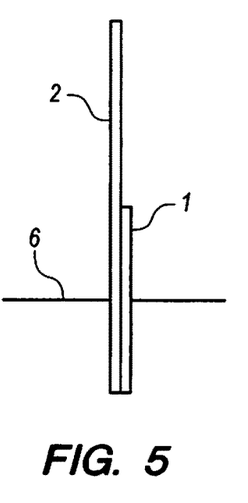
Figure 6:
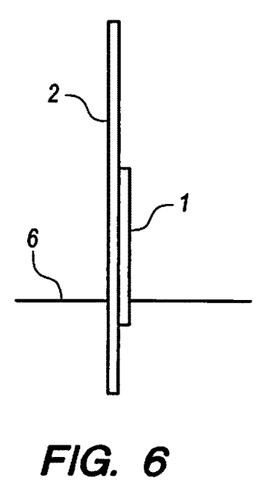

FIGS. 4-6 are diagrammatic side view of examples of different installed barriers incorporating the new filter 1 and the load-bearing sheet material 2 to which the new filter 1 is attached. In all the Figures, part of the barrier is below the ground level 6. In FIG. 4, the filter 1 covers the whole surface of the load-bearing sheet material 2. In FIG. 5, the filter 1 covers a bottom section of the load-bearing sheet material, and part of the filter 1 is below the ground and part of it is above the ground. In FIG. 6, the filter 1 covers an intermediate section of the load-bearing sheet material, and a small part of the filter 1 is below the ground, and the remainder is above the ground but does not extend to the top of the load-bearing sheet material.

Figure 7:
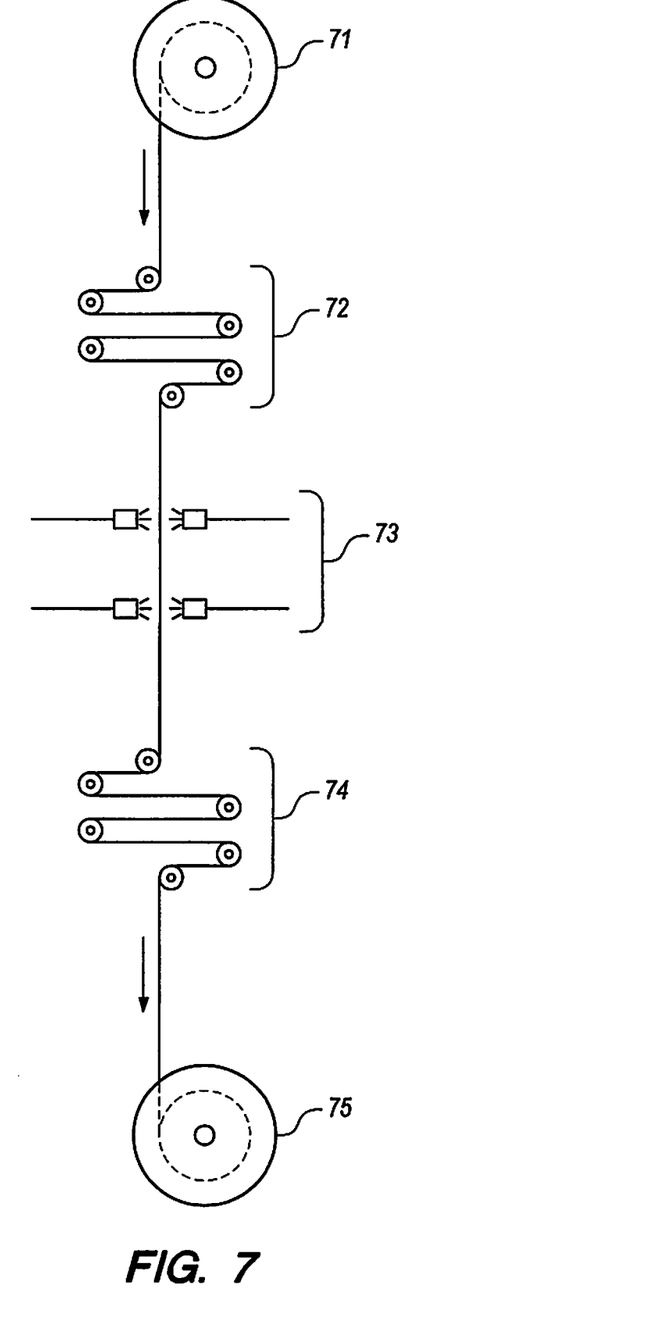
FIG. 7 shows the method of the fourth aspect of the invention.

FIG. 7 illustrates a process for cleaning a barrier which has been in use (and is, therefore, contaminated by sediment and/or harmful seeds and/or weeds and/or invasive plants) and has been removed. The barrier is rolled up into a roll one and then placed on a payoff mechanism. The barrier is removed from the payoff section and passes in turn through (1) a sediment chipping section 72 in which the barrier is subject to mechanical forces that remove and/or loosen the contaminants, (2) a wash station 73 in which it is subject to high pressure water and/or steam and (3) a drying section 74, before being wound up as a roll at a take-off section 75.

The invention claimed is:

1. A barrier material which comprises
(i) an elongate load-bearing apertured sheet material and
(ii) an elongate apertured sheet filter material which is attached to the load-bearing apertured sheet material,
the load-bearing apertured sheet material comprising
(A) a first set of melt-extruded polymeric strands which are (i) parallel to each other and (ii) spaced apart from each other with a distance between adjacent strands of 0.1 to 0.5 inch, and
(B) a second set of melt-extruded polymeric strands which are (i) parallel to each other, (ii) spaced apart from each other with a distance between adjacent strands of 0.1 to 0.5 inch, and (iii) at an angle to the first strands;
the first and second sets of polymeric strands (a) being bonded to each other at crossover sections at which the polymeric strands are bonded together, and (b) forming open apertures which have a first aperture size, measured by the procedure of ASTM D-4751, and
the filter material
(1) comprising
(A) a first set of melt-extruded polymeric strands which are (i) parallel to each other and (ii) spaced apart from each other, and
(B) a second set of melt-extruded polymeric strands which are (i) parallel to each other, (ii) spaced apart from each other, and (iii) at an angle of 50-80° to the first strands;
the first and second sets of polymeric strands (a) being bonded to each other at crossover sections at which the polymeric strands are bonded together, and (b) forming open apertures which have a second aperture size, measured by the procedure of ASTM D-4751, the second aperture size being less than 500µ (0.500 mm) and the first aperture size being at least 4 times the second aperture size,
(2) having a percentage open area (measured by COE 02215-86) of at least 25%, and
(3) having a length which can be changed elastically by at least 0.03%.

2. A barrier material according to claim 1 wherein (i) the second aperture size is less than 400µ and (ii) the first aperture size is at least 8 times the second aperture size.

3. A barrier material according to claim 2 which consists essentially of (i) the load-bearing sheet material, (ii) the filter material and (iii) means securing the filter material to the load-bearing sheet material.

4. A barrier material according to claim 2 which has a length of at least 25 feet and wherein the filter material has a thickness of less than 0.06 inch.

5. A barrier material according to claim 4 wherein the length of the filter material can be changed elastically by at least 0.1%.

6. A barrier material according to claim 5 which is in the form of multiple layers wrapped around a core having a diameter of 1-6 inch.

7. An area of ground which comprises a barrier material according to claim 1 which has been installed along an extended barrier line on the ground.

8. A barrier material which comprises (i) an elongate load-bearing apertured sheet material and (ii) an elongate apertured sheet filter material which is attached to the load-bearing apertured sheet material,
the load-bearing apertured sheet material
(1) comprising
(A) a first set of melt-extruded polymeric strands which are (i) parallel to each other and (ii) spaced apart from each other with a distance between adjacent strands of 0.1 to 0.5 inch, and
(B) a second set of melt-extruded polymeric strands which are (i) parallel to each other, (ii) spaced apart from each other with a distance between adjacent strands of 0.1 to 0.5 inch, and (iii) at an angle of 60-80° to the first strands;
the first and second sets of polymeric strands (i) being bonded to each other at crossover sections at which the polymeric strands are bonded together, and (ii) forming open apertures which have a first aperture size, measured by the procedure of ASTM D-4751, and
(2) having a percentage open area (measured by COE 02215-86) of at least 35%;
and the filter material
(1) comprising
(A) a first set of melt-extruded polymeric strands which are (i) parallel to each other and (ii) spaced apart from each other, and
(B) a second set of melt-extruded polymeric strands which are (i) parallel to each other, (ii) spaced apart from each other, and (iii) at an angle of 50-80° to the first strands;
the first and second sets of polymeric strands (i) being bonded to each other at crossover sections at which the polymeric strands are bonded together, and (ii) forming open apertures which have a second aperture size, measured by the procedure of ASTM D-4751, the second aperture size being less than 400µ and the first aperture size being at least 4 times the second aperture size,
(2) having a percentage open area (POA measured by COE 02215-86) of at least 30%,
(3) having a length which can be changed elastically by at least 0.1%, and
(4) has a thickness of 0.01-0.04 inch.

9. A barrier material according to claim 8 wherein (i) the second aperture size is less than 400µ and (ii) the first aperture size is at least 8 times the second aperture size.

10. A barrier material according to claim 9 wherein the second aperture size is 200-400µ.

11. A barrier material according to claim 8 wherein the filter material has a percentage open area of about 55%.

12. A barrier material according to claim 8 which has a length of at least 25 feet and wherein the filter material has a thickness of less than 0.06 inch.

13. A barrier material according to claim 12 wherein the length of the filter material can be changed elastically by at least 0.1%.

14. A barrier material according to claim 8 wherein the filter material has a thickness 0.015-0.03 inch and a width of at least 4 inch.

15. A barrier material according to claim 8 which consists essentially of (i) the load-bearing sheet material, (ii) the filter material and (iii) means securing the filter material to the load-bearing sheet material.

16. A barrier material according to claim 8 which is in the form of multiple layers wrapped around a core having a diameter of 1-6 inch.

17. An area of ground which comprises a barrier material according to claim 8 which has been installed along an extended barrier line on the ground.

18. An elongate filter material which
 (1) comprises
  (A) a first set of melt-extruded polymeric strands which are (i) parallel to each other and (ii) spaced apart from each other, and
  (B) a second set of melt-extruded polymeric strands which are (i) parallel to each other, (ii) spaced apart from each other, and (iii) at an angle of 50-80° to the first strands;
 the first and second sets of polymeric strands (i) being bonded to each other at crossover sections at which the polymeric strands are bonded together, and (ii) forming open apertures which have an aperture size, measured by the procedure of ASTM D-4751, which is less than 500µ (0.500 mm),
 (2) has a percentage open area (measured by COE 02215-86) of at least 25%,
 (3) has a thickness of less than 0.060 inch, and
 (4) has a length of at least 25 feet which can be changed elastically by at least 0.05%.

19. A filter material according to claim 18 which has an aperture size of 200-300 µm and whose length can be changed elastically by at least 0.1%.

20. A filter material according to claim 18 which has a thickness of 0.015-0.03 inch and a width of 6 to 36 inch.

* * * * *